US009213699B2

(12) United States Patent
Mukherjee et al.

(10) Patent No.: US 9,213,699 B2
(45) Date of Patent: Dec. 15, 2015

(54) SUPER-OBJECT IN ADMINISTERING SYSTEM

(75) Inventors: Biswajeet Mukherjee, Palatine, IL (US); James R. Miller, Glenview, IL (US); Rajiv Kambli, Cupertino, CA (US)

(73) Assignee: Aspect Software Inc., Chelmsford, MA (US)

( * ) Notice: Subject to any disclaimer, the term of this patent is extended or adjusted under 35 U.S.C. 154(b) by 322 days.

(21) Appl. No.: 12/150,624

(22) Filed: Apr. 30, 2008

(65) Prior Publication Data

US 2009/0276452 A1    Nov. 5, 2009

(51) Int. Cl.
*G06F 7/00* (2006.01)
*G06F 17/30* (2006.01)
(52) U.S. Cl.
CPC .... *G06F 17/30008* (2013.01); *G06F 17/30575* (2013.01); *G06F 17/30578* (2013.01); *G06F 17/30581* (2013.01)
(58) Field of Classification Search
CPC .......... G06F 17/30575; G06F 17/30578; G06F 17/30581
USPC ...... 707/610, 612, 62, 999.101, 620
See application file for complete search history.

(56) References Cited

U.S. PATENT DOCUMENTS

| | | | |
|---|---|---|---|
| 6,189,011 B1 * | 2/2001 | Lim et al. | 707/620 |
| 6,243,715 B1 * | 6/2001 | Bogantz et al. | 707/612 |
| 6,615,166 B1 * | 9/2003 | Guheen et al. | 703/27 |
| 6,721,713 B1 * | 4/2004 | Guheen et al. | 705/1.1 |
| 7,139,748 B1 * | 11/2006 | Mills et al. | 707/612 |
| 7,685,183 B2 * | 3/2010 | Pace et al. | 707/610 |
| 7,725,433 B1 * | 5/2010 | Labrie | 707/612 |
| 7,743,022 B2 * | 6/2010 | Kaasten et al. | 707/612 |
| 7,743,023 B2 * | 6/2010 | Teodosiu et al. | 707/612 |
| 7,752,165 B2 * | 7/2010 | Ireland et al. | 707/609 |
| 2002/0095454 A1 * | 7/2002 | Reed et al. | 709/201 |
| 2002/0152277 A1 * | 10/2002 | Drees | 709/208 |
| 2003/0217077 A1 * | 11/2003 | Schwartz et al. | 707/200 |
| 2004/0177319 A1 * | 9/2004 | Horn | 715/501.1 |
| 2004/0181796 A1 * | 9/2004 | Fedotov et al. | 719/323 |
| 2004/0199867 A1 * | 10/2004 | Brandenborg | 715/500.1 |
| 2005/0278458 A1 * | 12/2005 | Berger et al. | 709/248 |
| 2006/0101087 A1 * | 5/2006 | Tsukada et al. | 707/200 |
| 2006/0173868 A1 * | 8/2006 | Angele et al. | 707/100 |
| 2007/0055647 A1 * | 3/2007 | Mullins et al. | 707/2 |
| 2007/0214423 A1 * | 9/2007 | Teplov et al. | 715/751 |
| 2008/0146272 A1 * | 6/2008 | Rao et al. | 455/556.1 |
| 2009/0112939 A1 * | 4/2009 | Sanghvi et al. | 707/201 |

* cited by examiner

Primary Examiner — Mark E Hershley
(74) Attorney, Agent, or Firm — Husch Blackwell LLP

(57) ABSTRACT

Method and system maintaining "super-objects" in a central administering system, where each super-object is associated with corresponding objects in target systems so that editing of that super-object or of one of its associated objects results in conforming edits for all of the associated objects.

21 Claims, 3 Drawing Sheets

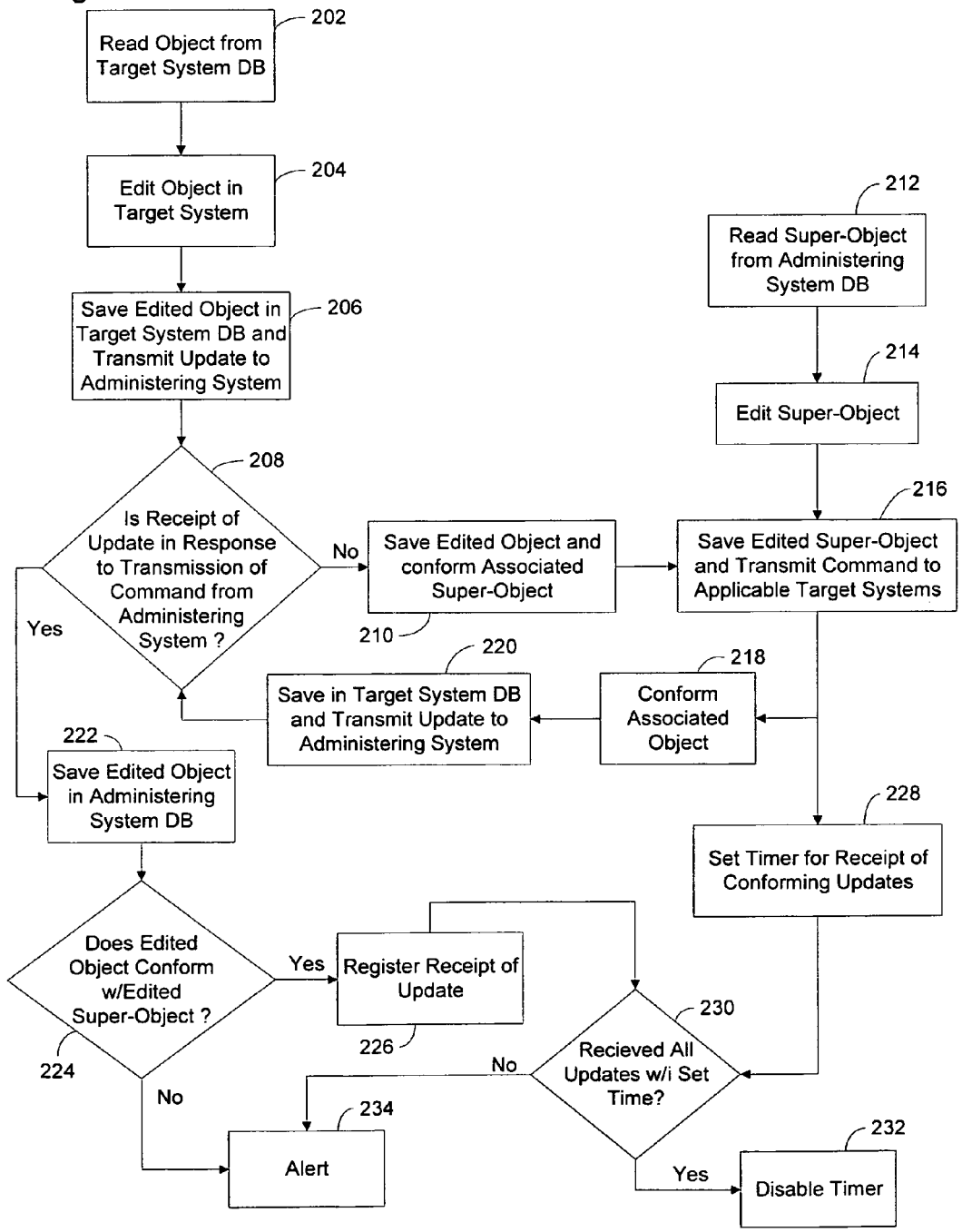

SUPER-OBJECT IN ADMINISTERING SYSTEM

This invention pertains to administering multiple target systems, particularly where different target systems share certain assets or other entities that are represented as objects in virtual images of the target systems.

BRIEF DESCRIPTION OF THE DRAWINGS

FIG. 3 is a simplified flow chart illustrating an example of a method incorporating the invention.

DETAILED DESCRIPTION OF SOME EMBODIMENTS

Figure 1:
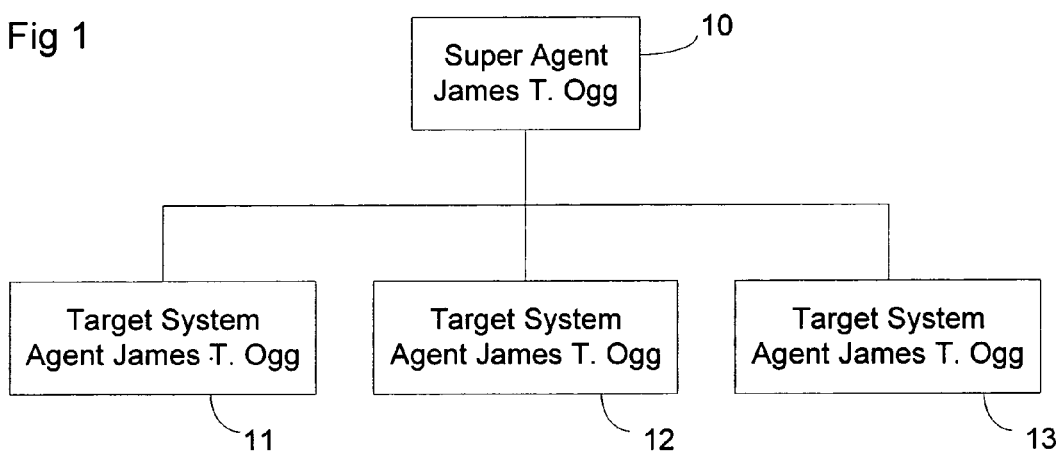
FIG. 1 is a block diagram illustrating an example of associating a "super-object" with corresponding objects in different target systems.

While the present invention is susceptible of embodiment in various forms, there is shown in the drawings and will hereinafter be described some embodiments with the understanding that the present disclosure is to be considered an exemplification of the invention and is not intended to limit the invention to the specific embodiments illustrated or described.

The present invention can be used with a central system for administering multiple target systems. A work force management system and a quality management system are examples of such systems. Also as one example, a central system may be used in administering automatic contact distribution (ACD) systems. Among other functions, ACD systems distribute telephone calls or other contacts that are made to an organization. Typically, a large organization may utilize multiple ACD systems that may operate respectively from geographically dispersed ACD centers, and different ACD systems may back up each other. For example, a major failure due to a natural disaster or other cause may render one ACD system inoperative, and contacts addressed to that ACD system would then be rerouted to a second ACD system for distribution. For that reason and to achieve efficiencies in general, different ACD systems may share certain assets or other entities. For example, different ACD systems may share an agent (i.e., a human being who will communicate with a person who initiates a contact to the organization or who receives a contact from the organization). In that case, contacts could be directed to that same agent through different ACD systems. This might be particularly useful if one ACD system became inoperative, as mentioned above.

In the context of the example of ACD systems, some other examples of such types of shared entities include agent groups, agent super groups, trunk groups (i.e., collections of telephone lines), ANIs (i.e., caller numbers), DNISs (i.e., called numbers), supervisor teams, agent supervisors, announcements, categories of contact subject matter (e.g., billing, sales, maintenance support, etc.), classes of service (i.e., standard sets of permissions such as only in-calls, etc.), clients of a central administering system (e.g., outside observers monitoring statistics), system managers, and technicians.

In administering a system, certain assets or other entities of the system can be represented virtually as certain units of information hereinafter referred to as objects. For example, an ACD system could represent a particular agent as an object that might include specified information such as his name, his nickname, his employment history, different services that he can provide, various performance statistics, his scheduling information, and so forth. If a particular agent James T. Ogg is shared by three different ACD systems, for example, then each ACD system would have an Agent James T. Ogg object. It is desirable that each Agent James T. Ogg object include the same information, and that each of those Agent James T. Ogg objects gets updated accurately whenever the pertinent information for agent Ogg changes. This is not necessarily a simple task as the ACD systems of an organization may include many thousands of objects.

In some embodiments, this synchronization task is facilitated by maintaining an Agent James T. Ogg "super-object" in a central administering system. FIG. 1 illustrates an example of associating a super-object 10 in a central administering system with corresponding objects 11, 12 and 13 in different respective target systems. Any change in information about agent Ogg will be reflected in the Agent James T. Ogg super-object 10 and in each of the corresponding Agent James T. Ogg objects 11, 12 and 13. For example, such changes may include information such as that agent Ogg will be on vacation and unavailable during his normally scheduled times, or that agent Ogg received certain training and has added new services to the portfolio of services he can provide, or that agent Ogg has resigned from the organization.

Figure 2:
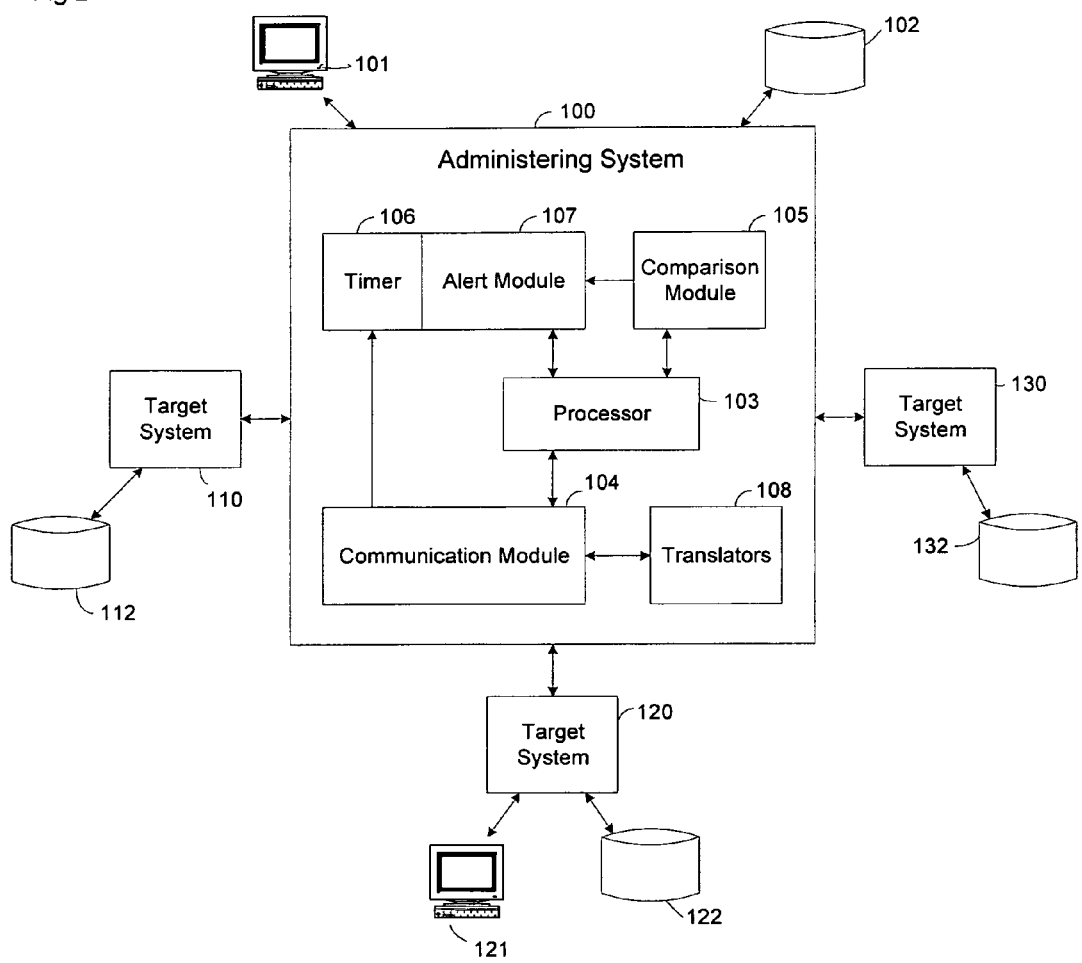
FIG. 2 is a simplified block diagram illustrating an example of a system incorporating the invention.

In the example of FIG. 2, central administering system 100 is in communication with multiple target systems, of which target system 110, target system 120 and target system 130 are illustrated. Each target system 110, 120 and 130 has its own database 112, 122 and 132, respectively. Central system 100 has its own database 102. Each of the systems may have multiple user interfaces, of which administering system 100's user interface 101 and target system 120's user interface 121 are illustrated. The association between a super-object and its corresponding objects is stored in the central system database 102.

In a preferred embodiment, objects may be edited locally within any particular target system 110, 120 or 130 etc. and, indeed, any particular target system 110, 120 or 130 etc. is said to be the "master of its own data." In that embodiment, data of a particular target system 110, 120 or 130 etc. will be written to database 102 of the central administering system 100 only after it is received from that target system. That will not necessarily be the case in other embodiments. In this preferred embodiment, the association data linking a super-object with its corresponding objects is "owned" by the central administering system 100.

In the example illustrated in FIG. 3, editing an object may be initiated in central administering system 100 or in one of the target systems such as target system 120. For example, in initiating an edit in central administering system 100, super-object 10 is read from database 102 in step 212. In step 214, a user may edit super-object 10 via interface 101. In initiating an edit in target system 120, for example, associated object 12 is read from database 122 in step 202. In step 204, a user may edit object 12 via interface 121. In step 206, edited object 12 is saved in database 122 and the appropriate update is transmitted to administering system 100. In step 208, administering system 100 determines whether receipt of the update was in response to a transmission of a command from administering system 100 to target system 120. It would not be if the edit was initiated in target system 120 and, in step 210, administering system 100 updates its own image of the edited object 12 in database 102 and conforms super-object 10 to the edited object 12 with which super-object 10 is associated. It does this by reading super-object 10 from database 102 and editing it to conform with the update of edited object 12 that it received from target system 120.

In step 216, administering system 100 saves the edited super-object 10 in database 102 and transmits an appropriate command to each of the applicable target systems. If the edit was initiated in central administering system 100, then the applicable target systems include each of the systems with an object associated with super-object 10—i.e., target systems 110, 120 and 130 in the illustrated example. If the edit was initiated in target system 120, for example, then the applicable target systems would include the other target systems with an object associated with super-object 10—i.e., target systems 110 and 130 in the illustrated example. In step 228, a timer 106 is set for receipt of conforming updates of the edited objects from the applicable target systems.

In step 218, each of the target systems receiving a command generated in conjunction with the editing of super-object 10, conforms its associated object (i.e., its object associated with super-object 10) with the edited super-object 10. For example, target system 110 does this by reading its corresponding object 11 from its database 112 and editing it to conform with the edited super-object 10 in accordance with the command that it received from the central administering system 100. In step 220, each of the target systems receiving a command updates its associated object (such as object 11) in its database (such as database 112), and sends the update to central administering system 100.

In step 208, administering system 100 determines whether each receipt of an update is in response to a transmission of a command from the central administering system 100 to the target system transmitting that update. It generally would be unless the edit was initiated in that target system that transmitted the update. In step 222, the central administering system 100 updates its own image of the edited object in database 102. In step 224, central administering system 100 determines whether the update of the edited object that it received in response to transmission of a command generated in conjunction with editing a super-object, with which the edited object is associated, conforms with that edited super-object. If it does, then receipt of that update is registered in step 226.

Database 102 may constitute a means for maintaining a super-object in the central administering system 100. A communication module 104 may constitute a means for transmitting commands to applicable target systems so that the respective objects of the applicable systems can be edited to conform with an edited super-object, and a means for receiving updates of edited objects from applicable target systems. A comparison module 105 may constitute means for confirming whether updates of edited objects that are received conform with an edited super-object with which those edited objects are associated. A processor 103 in communication with database 102, user interface 101, and communication module 104 may constitute means for processing edits of the super-object to update information concerning the entity.

In step 230, it is determined whether updates of edited objects that conform with the edited super-object have been received from all of the applicable target systems within the time set in step 228. If they all have been received, then the timer 106 is disabled in step 232. If updates of edited objects that conform with the edited super-object are not received from all of the applicable target systems within the set time, or if an update of an edited object is determined in step 224 not to conform with the edited super-object, then, in step 234, a user alert is raised or an exception record is created to indicate that a particular target system is not in synchronization with the other target systems or with the central administering system 100. A user such as a system administrator would have to process the exception record to determine why the synchronization did not occur and what to do about those circumstances. An alert module 107 with input from timer 106 and from comparison module 105 may constitute a means for generating an indication that updates of all edited objects have not been received within a predetermined time and a means for generating an indication that an update of one of the objects does not conform with the edited super-object.

It can occur that different target systems will use different schema, requiring translators 108 so that central administering system 100 can communicate with the different target systems such as target systems 110, 120 and 130. Each such translator 108 may constitute a means for translating between a schema of the central administering system 100 and a schema of one of the target systems. It also can occur that all of the different target systems will not all include the same properties for objects that are associated with each other. For example, Agent James T. Ogg object 11 may include the property of agent nicknames, and Agent James T. Ogg object 13 may not include that property. "Jim" might be entered in the nickname field in object 11, and that field would not exist in object 13.

In some embodiments, in that case in which associated objects do not all have the same properties, each super-object includes all of the properties of any of its associated objects, but only the fields applicable to a particular target system would be used in determining conformity between a super-object and an object of that particular target system that is associated with that super-object. Central administering system 100 has knowledge of the commands that need to be generated for each target system, such as target systems 110, 120, and 130, when a super-object is edited. Examples of centrally administering multiple target systems that have different schema are disclosed in currently pending application Ser. No. 11/977,589, that is commonly owned with this application and is incorporated herein by reference.

From the foregoing, it will be observed that numerous modifications and variations can be effectuated without departing from the true spirit and scope of the novel concepts of the present invention. It is to be understood that no limitation with respect to the specific embodiments illustrated or described is intended or should be inferred. Furthermore, while the example of target ACD systems has been used to identify examples of specific shared entities, the invention is equally applicable to centrally administering other types of target systems.

What is claimed is:

1. A method of administering multiple target systems, where a plurality of the target systems share a shared asset entity and where each of the plurality of the target systems represents the shared entity virtually as a respective shared object such that each respective target system has a respective shared object which can be edited locally within the respective target system and at least one shared object of a respective target system has at least one property different from associated respective shared objects of other target systems of the plurality of target systems the method comprising:

maintaining a super-object in a memory of a central administering system, the super-object being associated with each of the respective shared objects of the plurality of the target systems and including all properties of all of the respective shared objects, wherein each of the respective shared objects represents virtually the shared entity and wherein the shared entity comprises at least one of an agent and an agent group and the shared object comprises at least a name, services provided and scheduling information for the shared entity;

editing the super-object in a processor to update information concerning the shared entity wherein the information update is initiated by the editing of the super-object;

transmitting a command to each applicable system of the plurality of the target systems from the central administering system so that the respective shared objects of the applicable systems can be edited to conform with the edited super-object and each applicable target system editing the respective shared objects to conform with the edited super-object in response to the commands using only fields of the super-object applicable to a particular target system's shared object to determine conformity and each applicable target system transmitting the respective edited shared object to the central administering system, the applicable systems comprising the plurality of the target systems other than an initiating system of the plurality of the target systems if the information update was initiated in the initiating system.

2. The method in accordance with claim 1, further comprising:

receiving updates of the respective edited objects at the central administering system from the applicable systems;

the central administering system determining whether each received update was sent in response to the transmitted command being initiated from the central administering system; and confirming whether each of the updates of the respective edited objects received from the applicable systems conforms with the edited super-object if the update was sent in response to the transmitted command and registering receipt of the update if the update conforms with the edited super-object.

3. The method in accordance with claim 2, the super-object comprising a first set of properties, the first set of properties comprising all properties of all of the respective objects of the plurality of the target systems;

a first one of the respective objects of the applicable systems comprising a second set of properties;

the first set of properties comprising at least one missing property that the second set of properties does not comprise;

the at least one missing property of the super-object not being used in the confirming step when confirming whether the update of the first one of the respective objects conforms with the edited super-object.

4. The method in accordance with claim 2, further comprising: generating an indication that the update of the object of one of applicable systems does not conform with the edited super-object, if said indication is warranted by results of the confirming step.

5. The method in accordance with claim 2, further comprising: setting a timer for a predetermined time for receipt of updates in response to the transmitted command and generating an indication that all of the updates of the respective edited objects have not been received from the applicable systems if all of the updates of the respective edited objects have not been received within the predetermined time after performance of the transmitting step.

6. The method in accordance with claim 1, wherein the information update is initiated in the initiating system, by editing the object of the initiating system and transmitting an update of said edited object to the central administering system so that the super-object can be edited to conform with the update of said edited object of the initiating system.

7. The method in accordance with claim 1, the target systems comprising automatic contact distribution systems;

the entity being of a particular object type, the object type being selected from a group consisting of agents, agent groups, agent super groups, trunk groups, caller numbers, called numbers, supervisor teams, agent supervisors, announcements, categories of contact subject matter, classes of service, clients of the central administering system, system managers, and technicians.

8. The method in accordance with claim 1, further comprising: translating between a schema of the central administering system and a schema of one of the plurality of the target systems.

9. A central system for administering multiple target systems, where a plurality of the target systems share a shared entity and where each of the plurality of the target systems represents the shared entity virtually as a respective shared object such that each respective target system has a respective shared object which can be edited locally within the respective target system and at least one shared object of a respective target system has at least one property different from associated respective shared objects of other target systems of the plurality of target systems, the central administering system comprising:

a database which stores a super-object, the super-object being associated with each of the respective shared objects of the plurality of the target systems and including all properties of all the respective shared objects, wherein each of the respective shared objects represents the shared entity virtually and wherein the shared entity comprises at least one of an agent and an agent group and the respective shared object comprises at least a name, services provided and schedule information for the shared entity;

a processor which receives and processes edits of the super-object that update information concerning the shared entity wherein the information update is initiated by editing of the super-object;

a communication module which transmits a command from the central administering system to each applicable system of the plurality of the target systems so that the respective shared objects of the applicable systems can be edited to conform with the edited super-object, and each applicable target system editing the respective shared objects to conform with the edited super-object in response to the commands using only fields of the super-object applicable to a particular target system's shared object to determine conformity and each applicable target system transmitting the respective edited shared object to the central administering system, the applicable systems comprising the plurality of the target systems other than an initiating system of the plurality of the target systems if the information update was initiated in the initiating system.

10. The system in accordance with claim 9, further comprising:

the communication module also can receive updates of the respective edited objects from the applicable systems;

a comparison module for confirming whether each of the updates of the respective edited objects received from the applicable systems conforms with the edited super-object if the update was sent in response to the transmitted command being initiated from the central administering system.

11. The system in accordance with claim 10,
the super-object comprising a first set of properties, the first set of properties comprising all properties of all of the respective objects of the plurality of the target systems;
a first one of the respective objects of the applicable systems comprising a second set of properties;
the first set of properties comprising at least one missing property that the second set of properties does not comprise;
the at least one missing property of the super-object not being used by the comparison module in confirming whether the update of the first one of the respective objects conforms with the edited super-object.

12. The system in accordance with claim 10, further comprising: an alert module for generating an indication that the update of the object of one of applicable systems does not conform with the edited super-object, if said indication is warranted by a signal from the comparison module.

13. The system in accordance with claim 10, further comprising: an alert module for generating an indication that all of the updates of the respective edited objects have not been received from the applicable systems if all of the updates of the respective edited objects have not been received within a predetermined time after transmission by the communication module of the commands to the applicable systems of the plurality of the target systems.

14. The system in accordance with claim 9,
the target the systems comprising automatic contact distribution systems;
the entity being of a particular object type, the object type being selected from a group consisting of agents, agent groups, agent super groups, trunk groups, caller numbers, called numbers, supervisor teams, agent supervisors, announcements, categories of contact subject matter, classes of service, clients of the central administering system, system managers, and technicians.

15. The system in accordance with claim 9, further comprising: a translator designed to translate between a schema of the central administering system and a schema of one of the plurality of the target systems.

16. A central system for administering multiple target systems, where a plurality of the target systems share a shared entity and where that each of the plurality of the target systems represents the shared entity virtually as a respective shared object such that each respective target system has a respective shared object which can be edited within the respective target system and at least one shared object of a respective target system has at least one property different from associated respective shared objects of other target systems of the plurality of target systems, the central administering system comprising:
means for maintaining a super-object in the central administering system, the super-object being associated with each of the respective shared objects of the plurality of the target systems and including all properties of all of the respective shared objects, wherein each of the respective shared objects represent virtually the shared entity and wherein the shared entity comprises at least one of an agent and an agent group and the respective shared object comprises at least a name, services provided and scheduling information for the shared entity;
means for processing edits of the super-object to update information concerning the shared entity wherein the update of information is initiated by editing of the super-object;
means for transmitting a command from the central administering system to each applicable system of the plurality of the target systems so that the respective shared objects of the applicable systems can be edited to conform with the edited super-object, and each applicable target system editing the respective shared objects to conform with the edited super-object in response to the commands using only fields of the super-object applicable to a particular target system's shared object to determine conformity and each applicable target system transmitting the respective edited shared object to the central administering system, the applicable systems comprising the plurality of the target systems other than an initiating system of the plurality of the target systems if the information update was initiated in the initiating system.

17. The system in accordance with claim 16, further comprising:
means for receiving updates of the respective edited objects at the central administering system from the applicable systems;
means for determining whether each received update was sent in response to the transmitted command being initiated from the central administering system; and
means for confirming whether each of the updates of the respective edited objects received from the applicable systems conforms with the edited super-object if the update was sent in response to the transmittal command being initiated from the central administering system.

18. The system in accordance with claim 17, further comprising: means for generating an indication that the update of the object of one of applicable systems does not conform with the edited super-object, if said indication is warranted by a signal from the confirming means.

19. The system in accordance with claim 17, further comprising: means for generating an indication that all of the updates of the respective edited objects have not been received from the applicable systems if all of the updates of the respective edited objects have not been received within a predetermined time after transmission by the transmitting means of the commands to the applicable systems of the plurality of the target systems.

20. The system in accordance with claim 16,
the target systems comprising automatic contact distribution systems;
the entity being of a particular object type, the object type being selected from a group consisting of agents, agent groups, agent super groups, trunk groups, caller numbers, called numbers, supervisor teams, agent supervisors, announcements, categories of contact subject matter, classes of service, clients of the central administering system, system managers, and technicians.

21. The system in accordance with claim 16, further comprising: means for translating between a schema of the central administering system and a schema of one of the plurality of the target systems.

* * * * *